(12) United States Patent
Jas

(10) Patent No.: US 11,409,867 B2
(45) Date of Patent: Aug. 9, 2022

(54) BEHAVIORAL DETECTION OF MALICIOUS SCRIPTS

(71) Applicant: Juniper Networks, Inc., Sunnyvale, CA (US)

(72) Inventor: Frank Jas, Scotts Valley, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 489 days.

(21) Appl. No.: 16/368,071

(22) Filed: Mar. 28, 2019

(65) Prior Publication Data

US 2020/0311266 A1 Oct. 1, 2020

(51) Int. Cl.
| | |
|---|---|
| G06F 21/00 | (2013.01) |
| G06F 21/56 | (2013.01) |
| G06F 8/41 | (2018.01) |
| G06F 21/55 | (2013.01) |

(52) U.S. Cl.
CPC ............ G06F 21/563 (2013.01); G06F 8/427 (2013.01); G06F 21/554 (2013.01)

(58) Field of Classification Search
CPC ....... G06F 21/554; G06F 21/563; G06F 8/427
See application file for complete search history.

(56) References Cited

U.S. PATENT DOCUMENTS

| | | | | |
|---|---|---|---|---|
| 2008/0126736 A1* | 5/2008 | Heil | ..................... | G06F 12/0253 711/171 |
| 2011/0239300 A1* | 9/2011 | Klein | .................. | H04L 63/1416 726/23 |
| 2011/0307956 A1 | 12/2011 | Yermakov et al. | | |
| 2012/0216280 A1 | 8/2012 | Zorn et al. | | |
| 2012/0266244 A1 | 10/2012 | Green et al. | | |
| 2016/0357962 A1* | 12/2016 | Tyagi | ..................... | G06F 21/562 |
| 2018/0300480 A1 | 10/2018 | Sawhney et al. | | |

FOREIGN PATENT DOCUMENTS

WO 2013067505 A1 5/2013

OTHER PUBLICATIONS

Bose et al., "Behavioral Detection of Malware on Mobile Handsets"., Jan. 2008, 15 pages. https://www.researchgate.net/publication/221234535_Behavioral_detection_of_malware_on_mobile_handsets.
Aho et al., "Compilers: Principles, Techniques, and Tools. (Second Edition)", 2014, 1,038 pages.
Extended European Search Report for Application No. EP19181592.7, dated Oct. 25, 2019, 9 pages.

* cited by examiner

Primary Examiner — Jeffrey C Pwu
Assistant Examiner — Thong P Truong
(74) Attorney, Agent, or Firm — Harrity & Harrity, LLP

(57) ABSTRACT

A script analysis platform may obtain a script associated with content wherein the script includes one or more functions that include one or more expressions. The script analysis platform may parse the script to generate a data structure and may traverse the data structure to determine the one or more functions and to determine properties of the one or more expressions, wherein traversing the data structure includes evaluating one or more constant sub-expressions of the one or more expressions. The script analysis platform may analyze the properties of the one or more expressions to determine whether the script exhibits malicious behavior. The script analysis platform may cause an action to be performed concerning the script or the content based on determining whether the script exhibits malicious behavior.

20 Claims, 10 Drawing Sheets

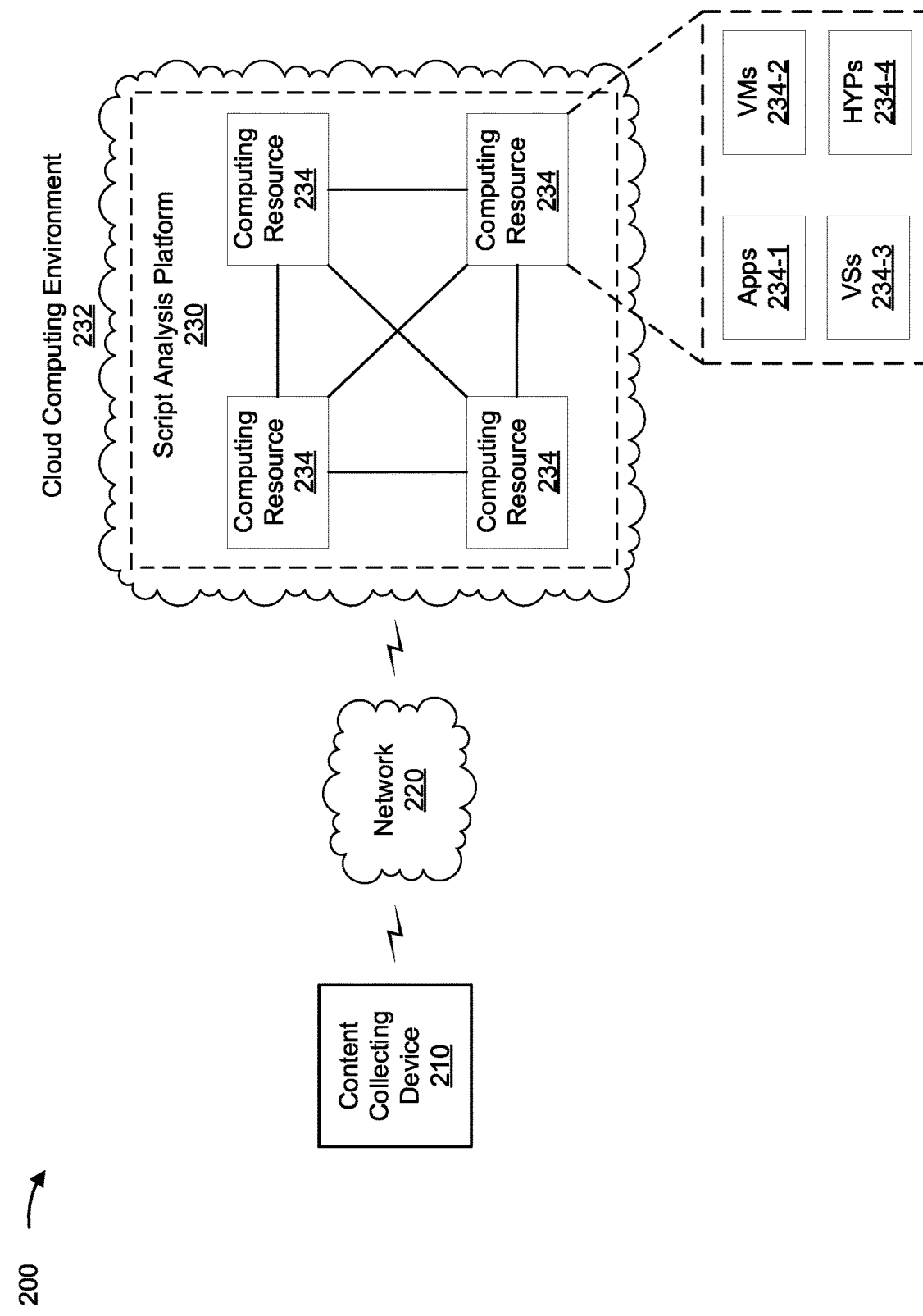

BEHAVIORAL DETECTION OF MALICIOUS SCRIPTS

BACKGROUND

An anti-malware device may analyze a script to determine whether the script is a malicious script. For example, the anti-malware device may analyze the script for hardcoded patterns known to be associated with malicious behavior.

SUMMARY

According to some implementations, a method may include obtaining, by a device, a script associated with content, wherein the script includes one or more functions that include one or more expressions; parsing, by the device, the script to generate a data structure, wherein the data structure represents a syntactic structure of the script; traversing, by the device, the data structure to determine the one or more functions; traversing, by the device and based on the one or more functions, the data structure to determine properties of the one or more expressions, wherein traversing the data structure to determine the properties of the one or more expressions includes evaluating one or more constant sub-expressions of the one or more expressions, wherein evaluating the one or more constant sub-expressions facilitates determining the properties of the one or more expressions; analyzing, by the device, the properties of the one or more expressions to determine whether the script exhibits malicious behavior; and causing, by the device, an action to be performed concerning the script or the content based on determining whether the script exhibits malicious behavior.

According to some implementations, a device may include one or more memories and one or more processors to: obtain a script associated with content from a content collecting device, wherein the script includes one or more functions that include one or more expressions; parse the script to generate a data structure; traverse the data structure to determine the one or more functions; traverse, based on the one or more functions, the data structure to determine one or more properties of the one or more expressions, wherein traversing the data structure to determine the one or more properties of the one or more expressions includes evaluating one or more constant sub-expressions of the one or more expressions, wherein evaluating the one or more constant sub-expressions facilitates determining the one or more properties of the one or more expressions; obtain information that describes one or more attributes of malicious behavior; analyze, based on the information, the one or more properties of the one or more expressions to determine whether the script exhibits malicious behavior; and cause an action to be performed concerning the script or the content based on determining whether the script exhibits malicious behavior.

According to some implementations, a non-transitory computer-readable medium may store instructions that comprise one or more instructions that, when executed by one or more processors, may cause the one or more processors to: obtain a script associated with content, wherein the script includes one or more functions that include one or more expressions; allocate, after obtaining the script, a block of memory; parse the script to generate a data structure that can be stored in the block of memory, wherein the data structure represents a syntactic structure of at least some of the script; store the data structure in the block of memory; traverse the data structure to determine the one or more functions; traverse, based on the one or more functions, the data structure to determine one or more properties of the one or more expressions, wherein traversing the data structure to determine the one or more properties of the one or more expressions includes evaluating one or more constant sub-expressions of the one or more expressions, wherein evaluating the one or more constant sub-expressions facilitates determining the one or more properties of the one or more expressions; analyze the one or more properties of the one or more expressions to determine whether the script exhibits malicious behavior; and cause an action to be performed concerning the script or the content based on determining whether the script exhibits malicious behavior.

BRIEF DESCRIPTION OF THE DRAWINGS

FIG. 2 is a diagram of an example environment in which systems and/or methods described herein may be implemented.

DETAILED DESCRIPTION

Figure 1A:
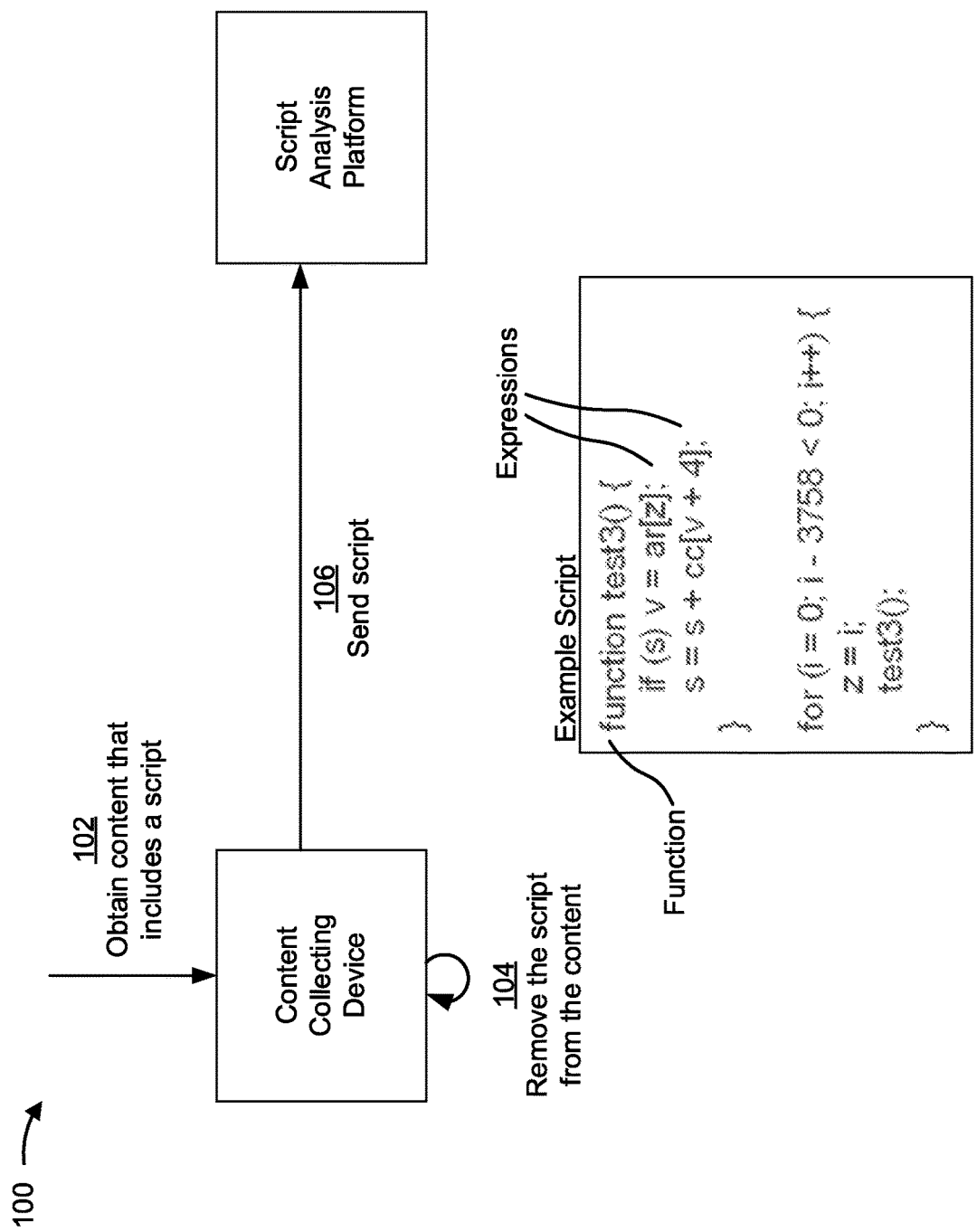
FIGS. 1A-1D are diagrams of one or more example implementations described herein.

The following detailed description of example implementations refers to the accompanying drawings. The same reference numbers in different drawings may identify the same or similar elements.

Anti-malware devices use different methods to detect malicious scripts that are associated with content (e.g., a document file, a portable document format (PDF) file, an email document file, and/or the like). For example, an anti-malware device may analyze a script for hardcoded patterns known to be associated with malicious behavior (e.g., using a signature-based analysis method). However, in some cases, a malicious script may have polymorphic properties, such as a self-modifying code behavior, that obfuscates hardcoded patterns known to be associated with malicious behavior. Moreover, a malicious script may call values, functions, objects, elements, and/or the like of a runtime environment in which the script is executed, which can further obfuscate the hardcoded patterns. Additionally, malicious scripts are continuously changing and evolving, which makes identifying and detecting new hardcoded patterns difficult.

Accordingly, in many cases, an anti-malware device may not detect a malicious script that has polymorphic properties, uses runtime environment calls, and/or exhibits other new malicious properties that have not previously been identified. This may result in the anti-malware device, and/or additional devices associated with the anti-malware device, becoming infected with the malicious script. This may cause the anti-malware device and/or the additional devises to use resources (e.g., processing resources, memory resources, networking resources, power resources, and/or the like) to copy and propagate the malicious script to other devices, download and propagate additional malicious code, perform one or more malicious actions, and/or the like. Further, the anti-malware device, the additional devices, and/or other devices may use resources to search for, contain, and/or eradicate the malicious script and/or remediate damage cause by the malicious script.

Some implementations described herein provide a script analysis platform device that is able to determine and analyze one or more behavioral properties of a script to determine whether a script is malicious. In some implementations, the script analysis platform may obtain a script associated with content, wherein the script includes one or more functions that include one or more expressions. In some implementations, the script analysis platform may parse the script to generate a data structure and may traverse the data structure to determine the one or more functions and to determine properties of the one or more expressions. In some implementations, the script analysis platform may evaluate one or more constant sub-expressions of the one or more expressions to facilitate determining the properties of the one or more expressions. In some implementations, the script analysis platform may analyze the properties of the one or more expressions to determine whether the script exhibits malicious behavior. In some implementations, the script analysis platform may cause an action to be performed concerning the script or the content based on determining whether the script exhibits malicious behavior.

In this way, some implementations described herein may conserve resources (e.g., processing resources, memory resources, networking resources, power resources, and/or the like) of the script analysis platform and/or additional devices associated with the script analysis platform that would otherwise be used as a result of the script analysis platform and/or the additional devices becoming infected with a malicious script that cannot be detected using a signature-based analysis method. For example, the script analysis platform may determine that a script exhibits malicious behavior based on properties of one or more expressions of the script, making identifying hardcoded patterns of the script unnecessary. Moreover, the script analysis platform may automatically perform an action, such as a delete and/or quarantine action, to limit the spread of a malicious script once the script analysis platform identifies the malicious script as exhibiting malicious behavior. This may conserve resources of the script analysis platform, the additional devices, and/or other devices that would otherwise be used to search for, contain, and/or eradicate the malicious script and/or remediate damage cause by the malicious script.

FIGS. 1A-1D are diagrams of one or more example implementations 100 described herein. Example implementation(s) 100 may include a content collecting device and a script analysis platform. The content collecting device and/or the script analysis platform may be a computing device, a server device, a cloud computing device, and/or the like. In some implementations, the content collecting device and the script analysis platform may be connected via a network, such as a wired network (e.g., the Internet or another data network), a wireless network (e.g., a wireless local area network, a wireless wide area network, a cellular network, etc.), and/or the like.

Some example implementations described herein concern a single content collecting device communicating with a single script analysis platform. In some implementations, a plurality of content collecting devices can communicate with one or more script analysis platforms. In some implementations, one or more functions of the content collecting device can be performed by the script analysis platform instead of, or in addition to, being performed by the content collecting device. In some implementations, one or more functions of the script analysis platform can be performed by the content collecting device instead of, or in addition to, being performed by the script analysis platform.

As shown in FIG. 1A and by reference number 102, the content collecting device may obtain content from one or more sources (not shown in FIG. 1A). The content may be a document file, such as a text document file (e.g., a .txt file), a Microsoft Office document file (e.g., a .docx, a .xlsx file, a .pptx file, and/or the like), a portable document format (PDF) file (e.g., a .pdf file), an email document file (e.g., a .eml file, a .msg file, and/or the like); an image file (e.g., a .jpeg file, a .tiff file, a .gif file, and/or the like), a video file (e.g., a .mpg file, a .avi file, a .mov file, and/or the like); an audio file (e.g., a .mp3 file, a .aac file, a .aiff file, and/or the like); a webpage file (e.g., a .html file, a .htm file, a .css file, and/or the like); and/or the like.

For example, in some implementations, the content collecting device may be an email firewall device that filters incoming email traffic to one or more devices on a network, and may obtain an email by receiving an email from an email server device. As another example, the content collecting device may be a file download collecting device that downloads files for one or more devices on a network, and may obtain a file by downloading the file from another device. In another example, the content collecting device may crawl a webpage (e.g., visit and search the webpage) to obtain a webpage file.

In some implementations, the content may include one or more scripts. For example, a script may be attached to the content (e.g., as an email attachment), embedded in the content (e.g., embedded in HTML code of a webpage), inserted into the content (e.g., added to a document file as a macro), and/or the like. The script may be a file that includes one or more instructions that can be executed by a computing device without user interaction. The script may be a particular type of script (e.g., the script may be programmed using a particular computer language). For example, the script may be a JavaScript script, a Visual Basic (VB) Script, a Visual Basic for Applications (VBA) script, a Jscript script, a PowerShell script, and/or the like.

The script may include one or more functions (e.g., one or more named sections of the script that perform specific tasks). For example, as shown in FIG. 1A, the example script includes a function called "test3." A function may include one or more expressions (e.g., one or more statements that respectively represent an instruction and/or a value). For example, as shown in FIG. 1A, expressions of the "test3" function of the example script include:

if (s) v=ar[z];
s=s+cc[v+4];

An expression may include one or more constant subexpressions. A constant subexpression may be a constant number value (e.g., 5, 3.14, −12, and/or the like), a constant string value (e.g., "Hello," "goodbye," and/or the like), a combination of constant number values and/or constant string values (e.g., "7+2," "'hello'+"world,'" and/or the like), a library function call associated with a computer language of the script (e.g., a replace( ) function call, a split( ) function call, a call( ) function call, and/or the like associated with the JavaScript computer language) that is called with at least one argument that is a constant number value, a constant string value, a combination of constant number values and/or constant string values, and/or the like, and/or the like.

As shown by reference number 104, the content collecting device may remove one or more scripts from the content. For example, the content collecting device may search the content to identify the one or more scripts and strip the one or more scripts from the content (e.g., remove one or more attachments from an email, remove script code from the HTML code of a webpage, remove one or more macros from a document file, and/or the like). As shown by reference number 106, the content collecting device may send the one or more scripts to the script analysis platform and/or the script analysis platform may obtain the one or more scripts from the content collecting device.

Figure 1B:
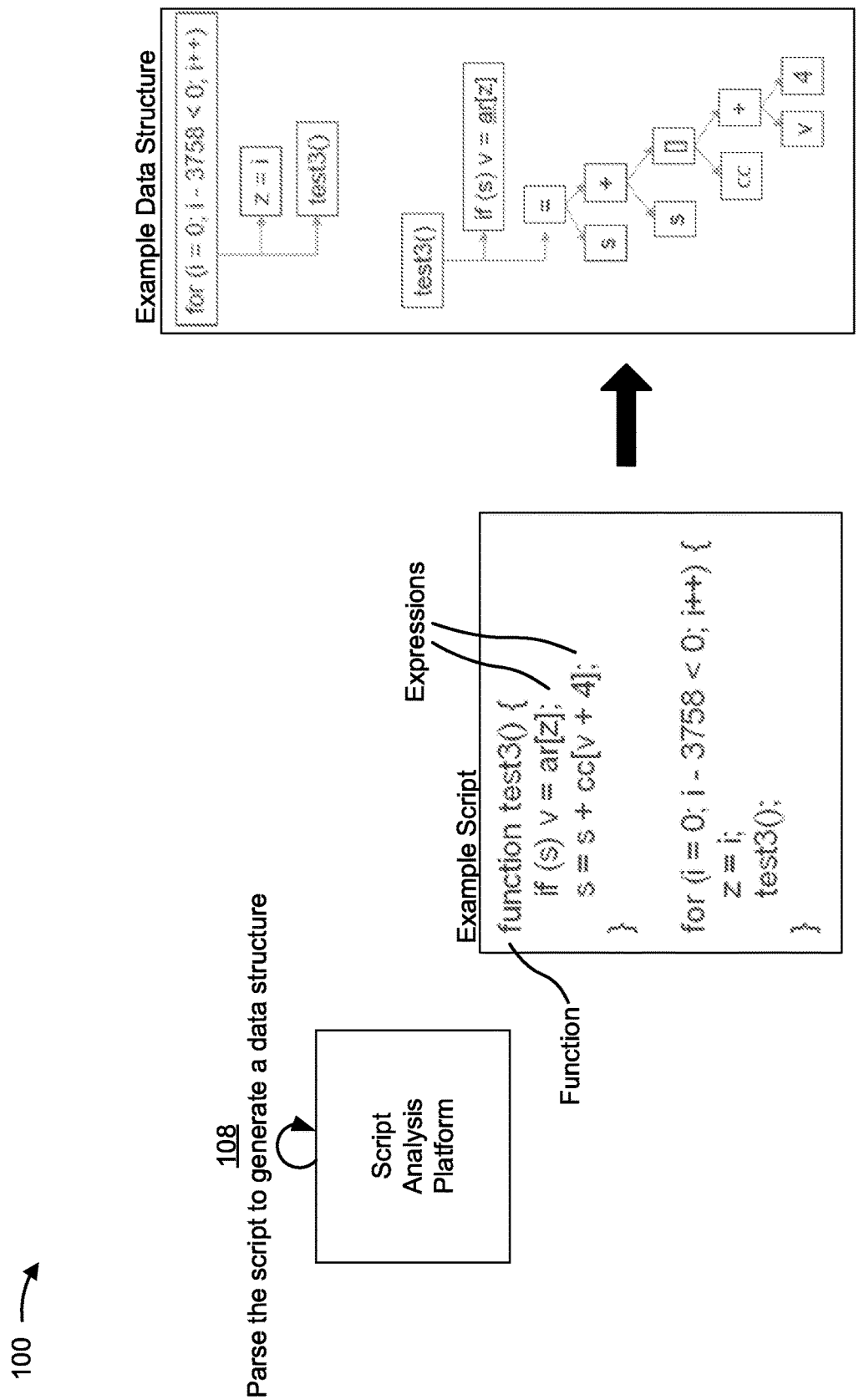

As shown in FIG. 1B and by reference number 108, the script analysis platform may parse the one or more scripts. For example, the script analysis platform may parse a script, of the one or more scripts, to generate a data structure. The data structure may represent a syntactic structure of the script, such as an abstract syntax tree (AST). For example, as shown in FIG. 1B, the script analysis platform may parse the example script to generate the example data structure.

In some implementations, the script analysis platform may allocate a block of memory to consecutively store two or more elements (e.g., branches, nodes, and/or the like) of the data structure. In this way, the script analysis platform can deallocate memory associated with the two or more elements by a single deallocation call, which can improve speed performance of the script analysis platform after the script analysis platform has completed its analysis of the script. In some implementations, the script analysis platform may parse a portion of the script to create a data structure that can be stored in the block of memory. That is, the script analysis platform may create a data structure that represents some (but not necessarily all) of the script so that the script analysis platform can store the data structure in the block of memory.

Figure 1C:
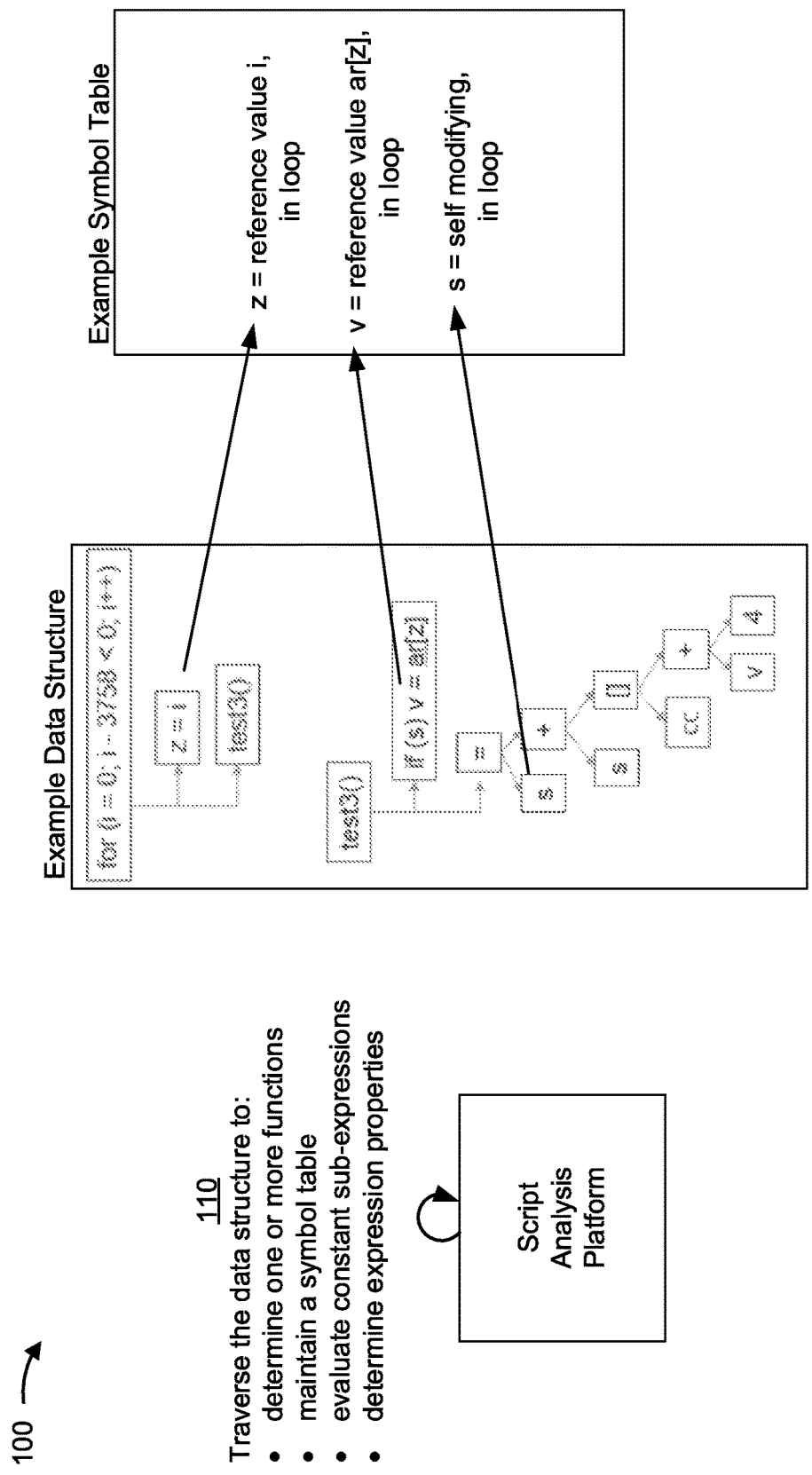
Figure 1D:
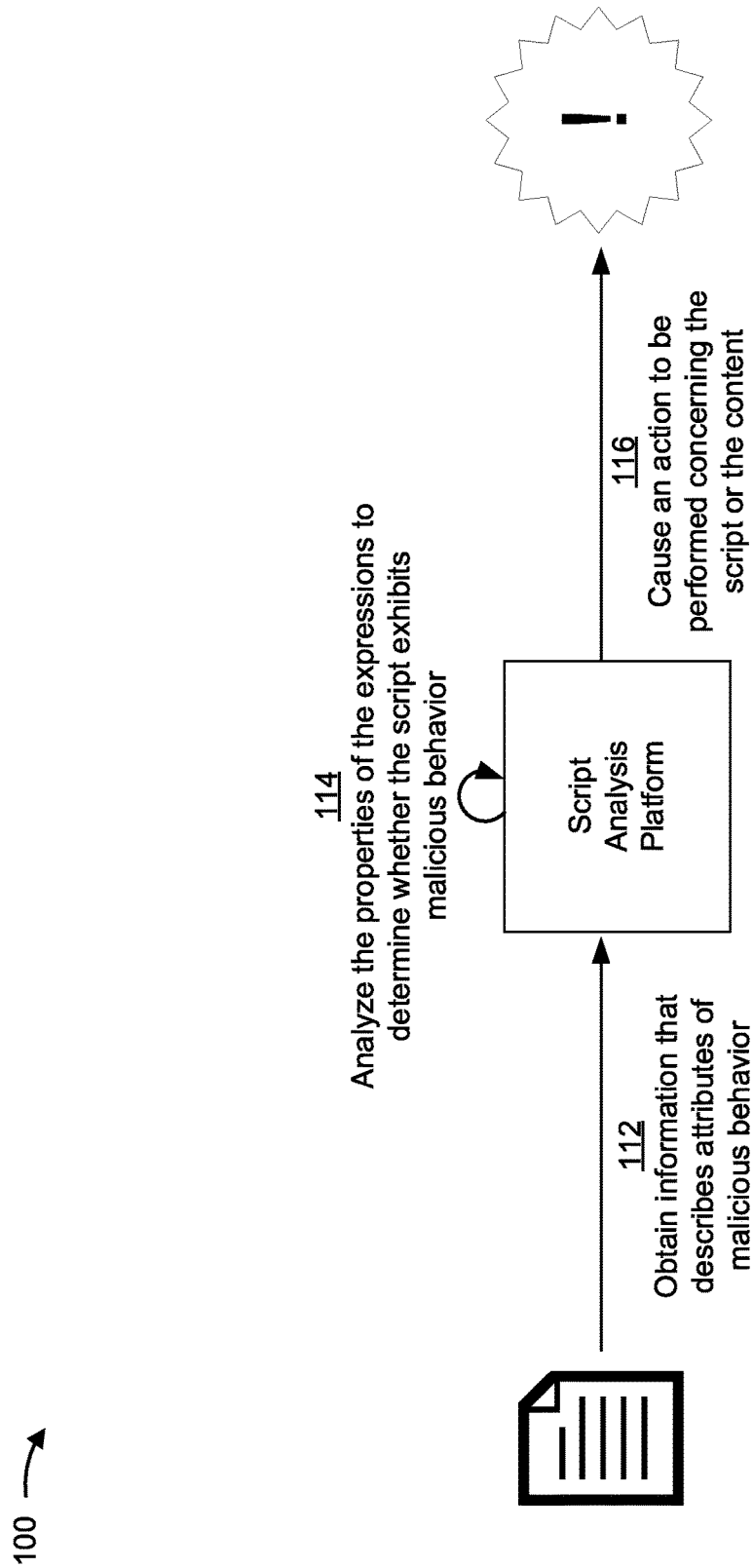

As shown in FIG. 1C and by reference number 110, the script analysis platform may traverse the data structure. In some implementations, the script analysis platform may traverse the data structure to determine one or more functions of the script. For example, the script analysis platform may traverse the data structure to extract the names of the one or more functions of the script. In this way, the script analysis platform may keep track of which functions the script analysis platform visits in association with additional traversals described herein. The script analysis platform then may visit any functions not visited during the additional traversals to ensure that the entire data structure is traversed.

In some implementations, the script analysis platform may traverse the data structure to determine properties of the one or more expressions of the script. To do so, the script analysis platform may determine one or more branches and/or one or more nodes (e.g., of the data structure) associated with the one or more expressions and traverse each branch of the one or more branches and/or each node of the one or more nodes. Moreover, as the script analysis platform traverses the data structure (e.g., traverses each branch and any node associated with each branch), the script analysis platform may maintain a call stack associated with the one or more expressions and may maintain one or more symbol tables for one or more identifiers associated with the one or more expressions of the script. For example, as shown in FIG. 1C, the script analysis platform may traverse the example data structure and maintain an example call stack (not shown) and an example symbol table.

For an identifier associated with a symbol table, the symbol table may include information concerning the identifier, such as a type of the identifier (e.g., whether the identifier is a number, a string, an object, and/or the like), a scope of the identifier (e.g., which function the identifier belongs to), a reference to an assigned value of the identifier (e.g., a reference to a variable value, a reference to an object value, a reference to an array value, and/or the like), whether the assigned value is assigned in a loop (e.g., a "for" loop, a "while" loop, and/or the like), whether the assigned value is assigned by a non-trivial assignment call (e.g., whether the assignment of the value to the identifier includes an additional reference to a number of other identifiers, function calls, and/or the like that satisfies a threshold (e.g., an assignment call is non-trivial when the number of other identifiers, function calls, and/or the like is greater than or equal to the threshold), whether the identifier is self-modifying (e.g., whether the identifier references the identifier in the assignment of the value to the identifier), and/or the like. For example, as shown in FIG. 1C, the example symbol table includes entries for the identifiers "z," "v" and "s" associated with the expressions of the example script. The entry for the "z" identifier includes information that indicates that the "z" identifier was assigned a reference value "i" and the assignment occurred in a loop. The entry for the "v" identifier includes information that indicates that the "v" identifier was assigned a reference value "ar[z]" and the assignment occurred in a loop. The entry for the "s" identifier includes information that indicates that the "s" was assigned a self-modifying value and the assignment occurred in a loop.

In some implementations, the one or more properties of the one or more expressions may be included in the one or more symbol tables (e.g., information included in the the one or more symbol tables may indicate the one or more properties of the one or more expressions). Additionally, or alternatively, the script analysis platform may determine the one or more properties of the one or more expressions of the script based on the information included in the one or more symbol tables. For example, for an expression that includes one or more identifiers, one or more properties of the expression may include the respective information concerning each identifier of the one or more identifiers included in the one or more symbol tables.

In some implementations, the script analysis platform may evaluate one or more constant sub-expressions of the one or more expressions as the script analysis platform traverses the data structure. For example, when a constant sub-expression includes an assignment "c=1" (e.g., an assignment of a constant number value "1" to an identifier "c") the script analysis platform may evaluate the constant sub-expression by updating a symbol table to indicate that an identifier "c" has the value "1," instead of a reference to the value "1." As another example, when a constant sub-expression includes a call to "b=String.fromCharCode(c+96)" (e.g., a Javascript library function call to convert a number value into a character) the script analysis platform may evaluate the constant sub-expression by updating a symbol table to indicate that an identifier "b" has the string value "a" (e.g., because c has the value "1" and the Unicode character code for "a" is "97") instead of a reference to the string value of "c+96." Evaluating the one or more constant sub-expressions in this way provides additional information about the one or more expressions while limiting a likelihood of inadvertently causing the script to perform a malicious behavior. This may facilitate the script analysis platform to determine the properties of the one or more expressions.

As shown in FIG. 1C and by reference number 112, the script analysis platform may obtain information that describes one or more attributes of malicious behavior. For example, the script analysis platform may obtain a description file that describes the one or more attributes (e.g., using computer code, text descriptions, and/or the like). The description file may also include descriptions of one or more attribute exceptions, such as when an attribute that is ordinarily associated with malicious behavior is not associated with malicious behavior. For example, a script packer that uses self-modifying code is an exception to the rule that self-modifying code behavior is an attribute of malicious behavior. In some implementations, a different device, such as a client device associated with the script analysis platform, may send the information to the script analysis platform. In this way, the script analysis platform may be periodically updated (e.g., on a scheduled basis, on an on-demand basis, on a triggered basis, on an ad-hoc basis, and/or the like) with up-to-date information regarding attributes of malicious behavior. This enables the script analysis platform to more effectively identify evolving attributes of malicious behavior. This also reduces an amount of time and resources (e.g., resources to maintain and update the script analysis platform) that would otherwise be needed to upgrade the script analysis platform.

As shown by reference number 114, the script analysis platform may analyze the one or more properties of the one or more expressions to determine whether the script exhibits malicious behavior, such as a self-modifying code behavior. In some implementations, the malicious behavior may have one or more attributes, such as accessing a global object using a complex array access; calling a function by calculating a complex expression; decoding a string value; calling an evaluation or execution function by performing a complex string calculation; and/or the like. In some implementations, the script analysis platform may identify and/or determine the one or more attributes based on the information obtained by the script analysis platform. For example, the script analysis platform may parse the description file to determine the descriptions of the one or more attributes of malicious behavior.

In some implementations, the script analysis platform may search the one or more symbol tables for a property that corresponds to an attribute of malicious behavior. For example, the script analysis platform may search a symbol table for a property that indicates that an identifier is assigned a decoded string value. In some implementations, the script analysis platform may determine that one or more properties of the one or more expressions correspond to at least one attribute of malicious behavior and that therefore the script exhibits malicious behavior. Additionally, or alternatively, the script analysis platform may determine that the one or more properties do not correspond to any of the one or more attributes of malicious behavior and that therefore the script does not exhibit malicious behavior.

In some implementations, the script analysis platform may identify a set of properties (e.g., at least one property), where each property of the set of properties corresponds to one or more attributes of malicious behavior. The script analysis platform may analyze the set of properties (e.g., analyze, in combination, each property of the set of properties) to determine whether the script exhibits malicious behavior. For example, the script analysis platform may determine whether the set of properties corresponds to the one or more attribute exceptions of the description file to determine whether the script exhibits malicious behavior.

As shown by reference number 116, the script analysis platform may cause an action to be performed concerning the script or the content. In some implementations, the script analysis platform may cause an action to be performed concerning the script or the content based on determining whether the script exhibits malicious behavior. For example, the script analysis platform may cause the action to be performed by performing the action or causing another device to perform the action. In some implementations, the script analysis platform may generate a message that includes one or more instructions to perform the action. The script analysis platform may send the message to a different device, such as the content collecting device, and the different device may receive the message, which may cause the different device to read the message and execute the one or more instructions to perform the action.

In some implementations, the script analysis platform may cause, based on determining that the script exhibits malicious behavior: the content or script to be deleted from the content collecting device; the content or script to be quarantined at the content collecting device to prohibit access to the content or script; a search to be performed, via a network, for other instances of the content or script on one or more other devices and for the other instances to be deleted; the one or more other devices to be analyzed for malicious behavior; a modification of network connectivity (e.g., limiting access to a local network, the internet, email, and/or the like) for the one or more other devices; and/or the like. Additionally, or alternatively, the script analysis platform may cause, based on determining that the script does not exhibit malicious behavior, the content collecting device to send the content or script to a different device (e.g., for the content collecting device to send the content or script to an original destination device for the content or script).

As indicated above, FIGS. 1A-1D are provided merely as one or more examples. Other examples may differ from what is described with regard to FIGS. 1A-1D.

FIG. 2 is a diagram of an example environment 200 in which systems and/or methods described herein may be implemented. As shown in FIG. 2, environment 200 may include a content collecting device 210, a network 220, a script analysis platform 230, one or more computing resources 234, and/or a cloud computing environment 232. Devices of environment 200 may interconnect via wired connections, wireless connections, or a combination of wired and wireless connections.

Content collecting device 210 includes one or more devices capable of receiving, generating, storing, processing, analyzing, and/or providing information, such as information described herein (e.g., content and/or scripts). For example, content collecting device 210 may include a computer (e.g., a desktop computer, a laptop computer, a tablet computer, a handheld computer, a server device, and/or the like), a mobile phone (e.g., a smart phone, a radiotelephone, and/or the like), an internet of things (IoT) device or smart appliance, a traffic transfer device, such as a router, a gateway, a switch, a firewall, a hub, a bridge, a reverse proxy, a server (e.g., a proxy server, a server executing a virtual machine, and/or the like), a security device, an intrusion detection device, a load balancer, or a similar type of device. In some implementations, content collecting device 210 can receive information from and/or transmit information to script analysis platform 230, such as via network 220, and/or the like. In some implementations, content collecting device 210 may be a physical device implemented within a housing, such as a chassis. In some implementations, content collecting device 210 may be a virtual device implemented by one or more computer devices of a cloud computing environment or a data center.

Network 220 includes one or more wired and/or wireless networks. For example, network 220 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Script analysis platform 230 includes one or more devices capable of obtaining information, such as a one or more scripts associated with content. In some implementations, script analysis platform 230 may obtain a script, may parse the script to generate a data structure, and may traverse the data structure to determine one or more functions of the script and to determine properties of one or more expressions of the one or more functions of the script. In some implementations, script analysis platform 230, when traversing the data structure, may evaluate one or more constant sub-expressions of the one or more expressions. In some implementations, script analysis platform 230 may analyze the properties of the one or more expressions to determine whether the script exhibits malicious behavior, and may cause an action to be performed concerning the script or the content based on determining whether the script exhibits malicious behavior. In some implementations, script analysis platform 230 may be designed to be modular such that certain software components may be swapped in or out depending on a particular need. As such, script analysis platform 230 may be easily and/or quickly reconfigured for different uses. In some implementations, script analysis platform 230 may receive information from and/or transmit information to content collecting device 210, such as via network 220.

In some implementations, as shown, script analysis platform 230 may be hosted in a cloud computing environment 232. Notably, while implementations described herein describe script analysis platform 230 as being hosted in cloud computing environment 232, in some implementations, script analysis platform 230 may be non-cloud-based (i.e., may be implemented outside of a cloud computing environment) or may be partially cloud-based.

Cloud computing environment 232 includes an environment that hosts script analysis platform 230. Cloud computing environment 232 may provide computation, software, data access, storage, etc. services that do not require end-user knowledge of a physical location and configuration of system(s) and/or device(s) that hosts script analysis platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host script analysis platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 includes a group of cloud resources, such as one or more applications ("APPs") 234-1, one or more virtual machines ("VMs") 234-2, virtualized storage ("VSs") 234-3, one or more hypervisors ("HYPs") 234-4, and/or the like.

Application 234-1 includes one or more software applications that may be provided to or accessed by content collecting device 210. Application 234-1 may eliminate a need to install and execute the software applications on content collecting device 210. For example, application 234-1 may include software associated with script analysis platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of content collecting device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
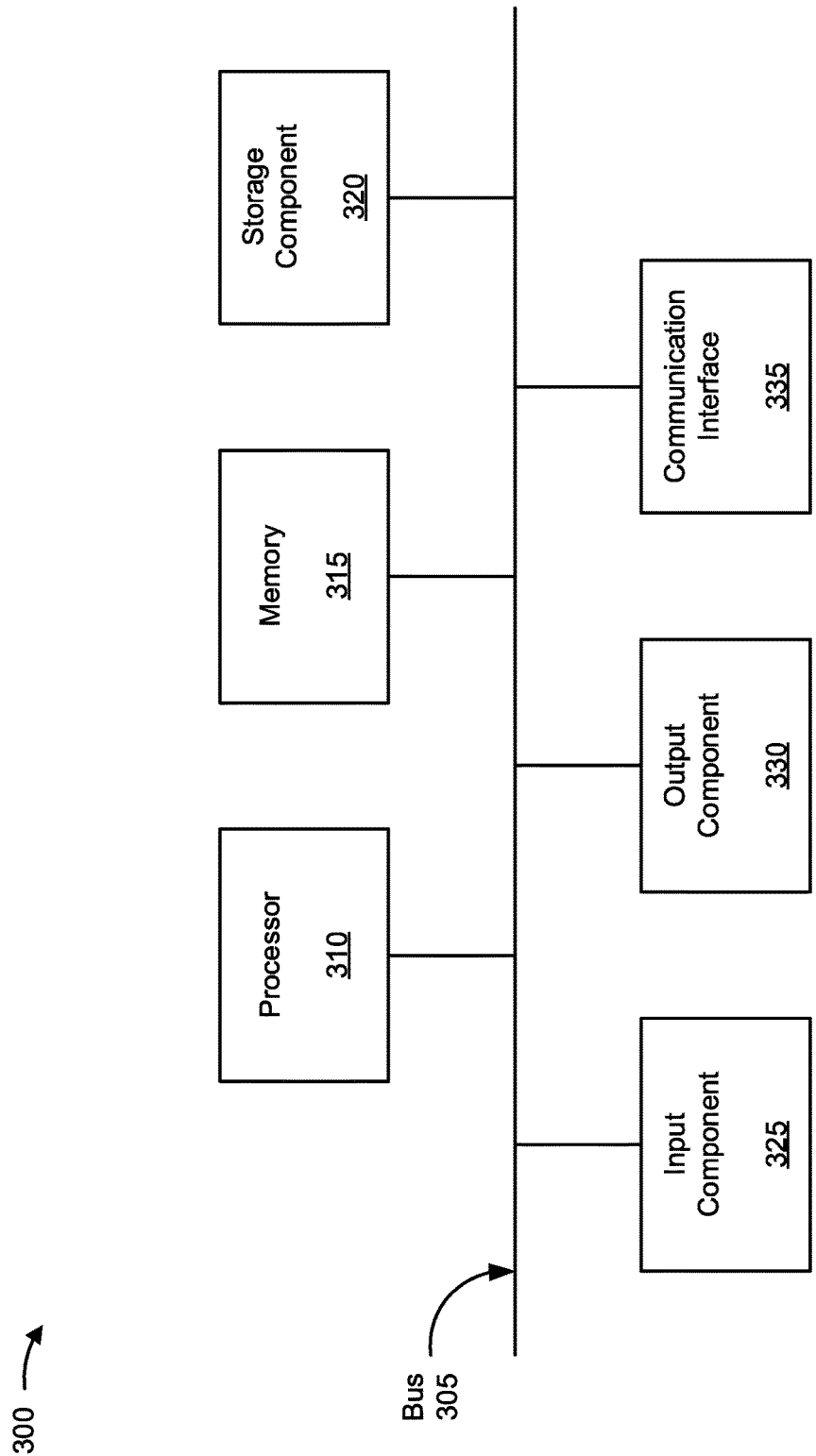
FIGS. 3A and 3B are diagrams of example components of one or more devices of FIG. 2.
Figure 3B:
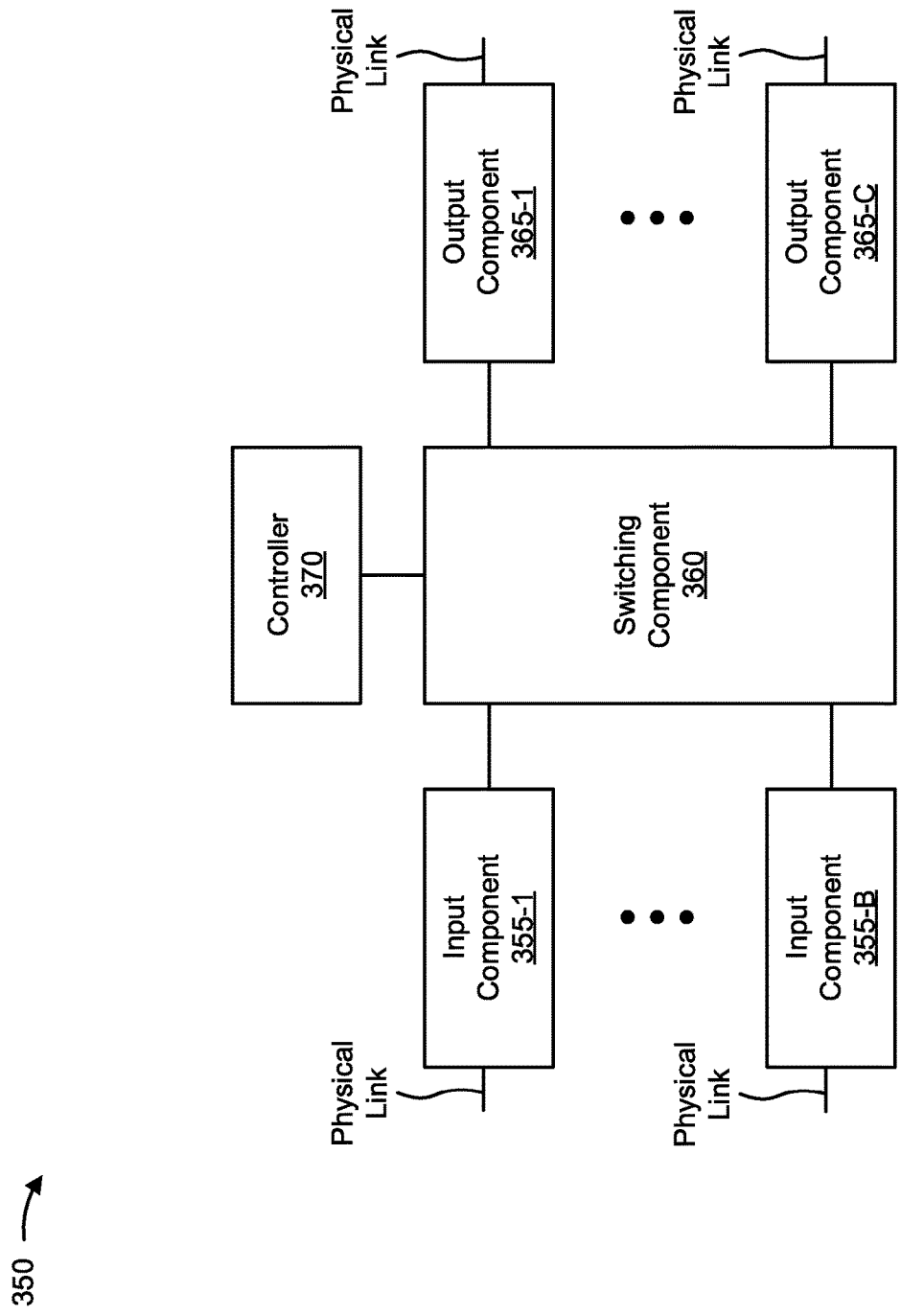

FIGS. 3A-3B are diagrams of example components of one or more devices of FIG. 2. FIG. 3A is a diagram of example components of a device 300. Device 300 may correspond to content collecting device 210, script analysis platform 230, cloud computing environment 232, computing resource 234, and/or the like. In some implementations, content collecting device 210, script analysis platform 230, cloud computing environment 232, computing resource 234, and/or the like may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to content collecting device 210, script analysis platform 230, computing resource 234, and/or the like. In some implementations, content collecting device 210, script analysis platform 230, computing resource 234, and/or the like may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
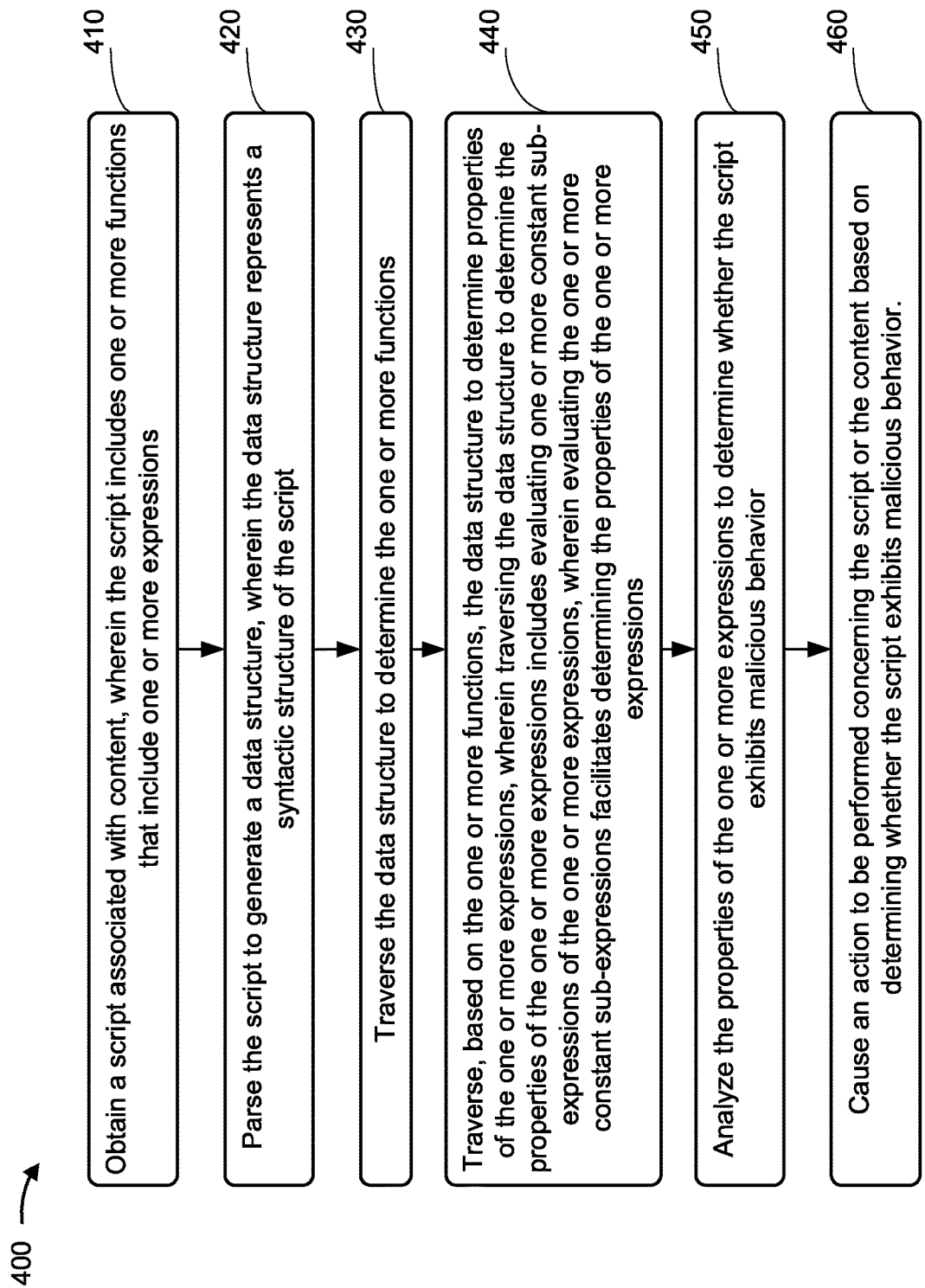
FIGS. 4-6 are flow charts of example processes for behavioral detection of malicious scripts.

FIG. 4 is a flow chart of an example process 400 for behavioral detection of malicious scripts. In some implementations, one or more process blocks of FIG. 4 may be performed by a script analysis platform (e.g., script analysis platform 230). In some implementations, one or more process blocks of FIG. 4 may be performed by another device or a group of devices separate from or including the script analysis platform, such as a content collecting device (e.g., content collecting device 210), a computing resource (e.g., computing resources 234), a cloud computing environment (e.g., cloud computing environment 232), and/or the like.

As shown in FIG. 4, process 400 may include obtaining a script associated with content, wherein the script includes one or more functions that include one or more expressions (block 410). For example, the script analysis platform (e.g., using computing resource 234, processor 310, memory 315, storage component 320, input component 325, output component 330, communication interface 335, input component 355, switching component 360, output component 365, controller 370, and/or the like) may obtain a script associated with content, as described above. In some implementations, the script includes one or more functions that include one or more expressions, as described above.

As further shown in FIG. 4, process 400 may include parsing the script to generate a data structure, wherein the data structure represents a syntactic structure of the script (block 420). For example, the script analysis platform (e.g., using computing resource 234, processor 310, memory 315, storage component 320, input component 325, output component 330, communication interface 335, input component 355, switching component 360, output component 365, controller 370, and/or the like) may parse the script to generate a data structure, as described above. In some implementations, the data structure represents a syntactic structure of the script.

As further shown in FIG. 4, process 400 may include traversing the data structure to determine the one or more functions (block 430). For example, the script analysis platform (e.g., using computing resource 234, processor 310, memory 315, storage component 320, input component 325, output component 330, communication interface 335, input component 355, switching component 360, output component 365, controller 370, and/or the like) may traverse the data structure to determine the one or more functions, as described above.

As further shown in FIG. 4, process 400 may include traversing, based on the one or more functions, the data structure to determine properties of the one or more expressions, wherein traversing the data structure to determine the properties of the one or more expressions includes evaluating one or more constant sub-expressions of the one or more expressions, wherein evaluating the one or more constant sub-expressions facilitates determining the properties of the one or more expressions (block 440). For example, the script analysis platform (e.g., using computing resource 234, processor 310, memory 315, storage component 320, input component 325, output component 330, communication interface 335, input component 355, switching component 360, output component 365, controller 370, and/or the like) may traverse, based on the one or more functions, the data structure to determine properties of the one or more expressions, as described above. In some implementations, traversing the data structure to determine the properties of the one or more expressions includes evaluating one or more constant sub-expressions of the one or more expressions. In some implementations, evaluating the one or more constant sub-expressions facilitates determining the properties of the one or more expressions.

As further shown in FIG. 4, process 400 may include analyzing the properties of the one or more expressions to determine whether the script exhibits malicious behavior (block 450). For example, the script analysis platform (e.g., using computing resource 234, processor 310, memory 315, storage component 320, input component 325, output component 330, communication interface 335, input component 355, switching component 360, output component 365, controller 370, and/or the like) may analyze the properties of the one or more expressions to determine whether the script exhibits malicious behavior, as described above.

As further shown in FIG. 4, process 400 may include causing an action to be performed concerning the script or the content, based on determining whether the script exhibits malicious behavior (block 460). For example, the script analysis platform (e.g., using computing resource 234, processor 310, memory 315, storage component 320, input component 325, output component 330, communication interface 335, input component 355, switching component 360, output component 365, controller 370, and/or the like) may cause an action to be performed concerning the script or the content based on determining whether the script exhibits malicious behavior, as described above.

Process 400 may include additional implementations, such as any single implementation or any combination of implementations described below and/or in connection with one or more other processes described elsewhere herein.

In some implementations, a constant sub-expression of the one or more constant sub-expressions includes at least one of a constant number value, a constant string value, a combination of constant number values or constant string values, a library function call associated with a computer language of the script that is called with at least one argument that is a constant number value, a constant string value, or a combination of constant number values or constant string values, and/or the like. In some implementations, the script is a JavaScript script, a Visual Basic (VB) Script, a Visual Basic for Applications (VBA) script, a Jscript script, a PowerShell script, and/or the like.

In some implementations, causing the action to be performed concerning the script or the content comprises causing, based on determining that the script exhibits malicious behavior, one or more of: the content or script to be deleted from a source device; the content or script to be quarantined at the source device to prohibit access to the content or script; a search to be performed, via a network, for other instances of the content or script on one or more other devices and for the other instances to be deleted; the one or more other devices to be analyzed for malicious behavior; a modification of network connectivity for the one or more other devices; and/or the like.

In some implementations, traversing the data structure to determine the properties of the one or more expressions comprises: maintaining a call stack associated with the one or more expressions; maintaining a symbol table for one or more identifiers associated with the one or more expressions; and determining the properties of the one or more expressions based on information included in the symbol table. In some implementations, the symbol table, for an identifier of the one or more identifiers, includes information indicating at least one of: a type of the identifier; a scope of the identifier; a reference to an assigned value of the identifier; whether the assigned value is assigned in a loop; whether the assigned value is assigned by a non-trivial assignment call; whether the identifier is self-modifying; and/or the like.

In some implementations, malicious behavior includes at least one of the following attributes: accessing a global object using a complex array access; calling a function by calculating a complex expression; decoding a string value; calling an evaluation or execution function by performing a complex string calculation; and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
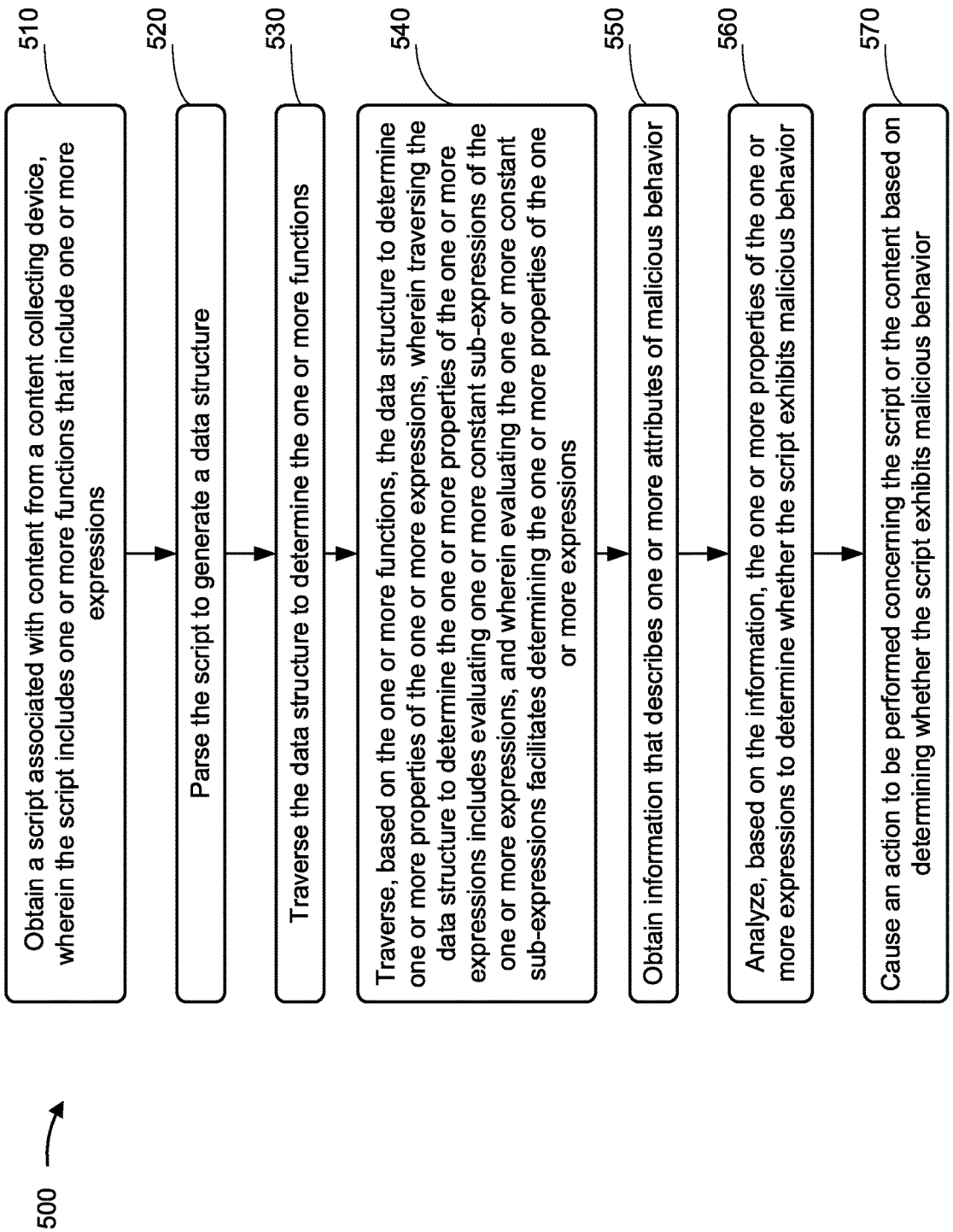

FIG. 5 is a flow chart of an example process 500 for behavioral detection of malicious scripts. In some implementations, one or more process blocks of FIG. 5 may be performed by a script analysis platform (e.g., script analysis platform 230). In some implementations, one or more process blocks of FIG. 5 may be performed by another device or a group of devices separate from or including the script analysis platform, such as a content collecting device (e.g., content collecting device 210), a computing resource (e.g., computing resources 234), a cloud computing environment (e.g., cloud computing environment 232), and/or the like.

As shown in FIG. 5, process 500 may include obtaining a script associated with content from a content collecting device, wherein the script includes one or more functions that include one or more expressions (block 510). For example, the script analysis platform (e.g., using computing resource 234, processor 310, memory 315, storage component 320, input component 325, output component 330, communication interface 335, input component 355, switching component 360, output component 365, controller 370, and/or the like) may obtain a script associated with content from a content collecting device, as described above. In some implementations, the script includes one or more functions that include one or more expressions.

As further shown in FIG. 5, process 500 may include parsing the script to generate a data structure (block 520). For example, the script analysis platform (e.g., using computing resource 234, processor 310, memory 315, storage component 320, input component 325, output component 330, communication interface 335, input component 355, switching component 360, output component 365, controller 370, and/or the like) may parse the script to generate a data structure, as described above.

As further shown in FIG. 5, process 500 may include traversing the data structure to determine the one or more functions (block 530). For example, the script analysis platform (e.g., using computing resource 234, processor 310, memory 315, storage component 320, input component 325, output component 330, communication interface 335, input component 355, switching component 360, output component 365, controller 370, and/or the like) may traverse the data structure to determine the one or more functions, as described above.

As further shown in FIG. 5, process 500 may include traversing, based on the one or more functions, the data structure to determine one or more properties of the one or more expressions, wherein traversing the data structure to determine the one or more properties of the one or more expressions includes evaluating one or more constant sub-expressions of the one or more expressions, and wherein evaluating the one or more constant sub-expressions facilitates determining the one or more properties of the one or more expressions (block 540). For example, the script analysis platform (e.g., using computing resource 234, processor 310, memory 315, storage component 320, input component 325, output component 330, communication interface 335, input component 355, switching component 360, output component 365, controller 370, and/or the like) may traverse, based on the one or more functions, the data structure to determine one or more properties of the one or more expressions, as described above. In some implementations, traversing the data structure to determine the one or more properties of the one or more expressions includes evaluating one or more constant sub-expressions of the one or more expressions. In some implementations, evaluating the one or more constant sub-expressions facilitates determining the one or more properties of the one or more expressions.

As further shown in FIG. 5, process 500 may include obtaining information that describes one or more attributes of malicious behavior (block 550). For example, the script analysis platform (e.g., using computing resource 234, processor 310, memory 315, storage component 320, input component 325, output component 330, communication interface 335, input component 355, switching component 360, output component 365, controller 370, and/or the like) may obtain information that describes one or more attributes of malicious behavior, as described above.

As further shown in FIG. 5, process 500 may include analyzing, based on the information, the one or more properties of the one or more expressions to determine whether the script exhibits malicious behavior (block 560). For example, the script analysis platform (e.g., using computing resource 234, processor 310, memory 315, storage component 320, input component 325, output component 330, communication interface 335, input component 355, switching component 360, output component 365, controller 370, and/or the like) may analyze, based on the information, the one or more properties of the one or more expressions to determine whether the script exhibits malicious behavior, as described above.

As further shown in FIG. 5, process 500 may include causing an action to be performed concerning the script or the content based on determining whether the script exhibits malicious behavior (block 570). For example, the script analysis platform (e.g., using computing resource 234, processor 310, memory 315, storage component 320, input component 325, output component 330, communication interface 335, input component 355, switching component 360, output component 365, controller 370, and/or the like) may cause an action to be performed concerning the script or the content based on determining whether the script exhibits malicious behavior, as described above.

Process 500 may include additional implementations, such as any single implementation or any combination of implementations described below and/or in connection with one or more other processes described elsewhere herein.

In some implementations, the data structure is an abstract syntax tree (AST). In some implementations, the malicious behavior is a self-modifying code behavior.

In some implementations, the script analysis platform, when traversing the data structure to determine the one or more properties of the one or more expressions, determines one or more branches associated with the one or more expressions and traverses each branch of the one or more branches to determine the one or more properties of the one or more expressions.

In some implementations, the script analysis platform, when parsing the script to generate the data structure, allocates a block of memory to consecutively store two or more elements of the data structure. In some implementations, memory associated with the two or more elements of the data structure is to be deallocated by one deallocation call.

In some implementations, the script analysis platform, when analyzing the one or more properties of the one or more expressions to determine whether the script exhibits malicious behavior, determines, based on the information, that a property, of the one or more properties, corresponds to at least one attribute, of the one or more attributes, of malicious behavior, and determines, based on the property corresponding to the at least one attribute of malicious behavior, that the script exhibits malicious behavior.

In some implementations, the script analysis platform, when analyzing the one or more properties of the one or more expressions to determine whether the script exhibits malicious behavior, determines, based on the information, that the one or more properties do not correspond to any of the one or more attributes of malicious behavior, and determines, based on the one or more properties not corresponding to any attribute of malicious behavior, that the script does not exhibit malicious behavior.

In some implementations, the script analysis platform, when causing the action to be performed concerning the script or the content, causes, based on determining that the script exhibits malicious behavior, the content or script to be deleted from the content collecting device, or causes, based on determining that the script does not exhibit malicious behavior, the content collecting device to send the content or script to a different device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
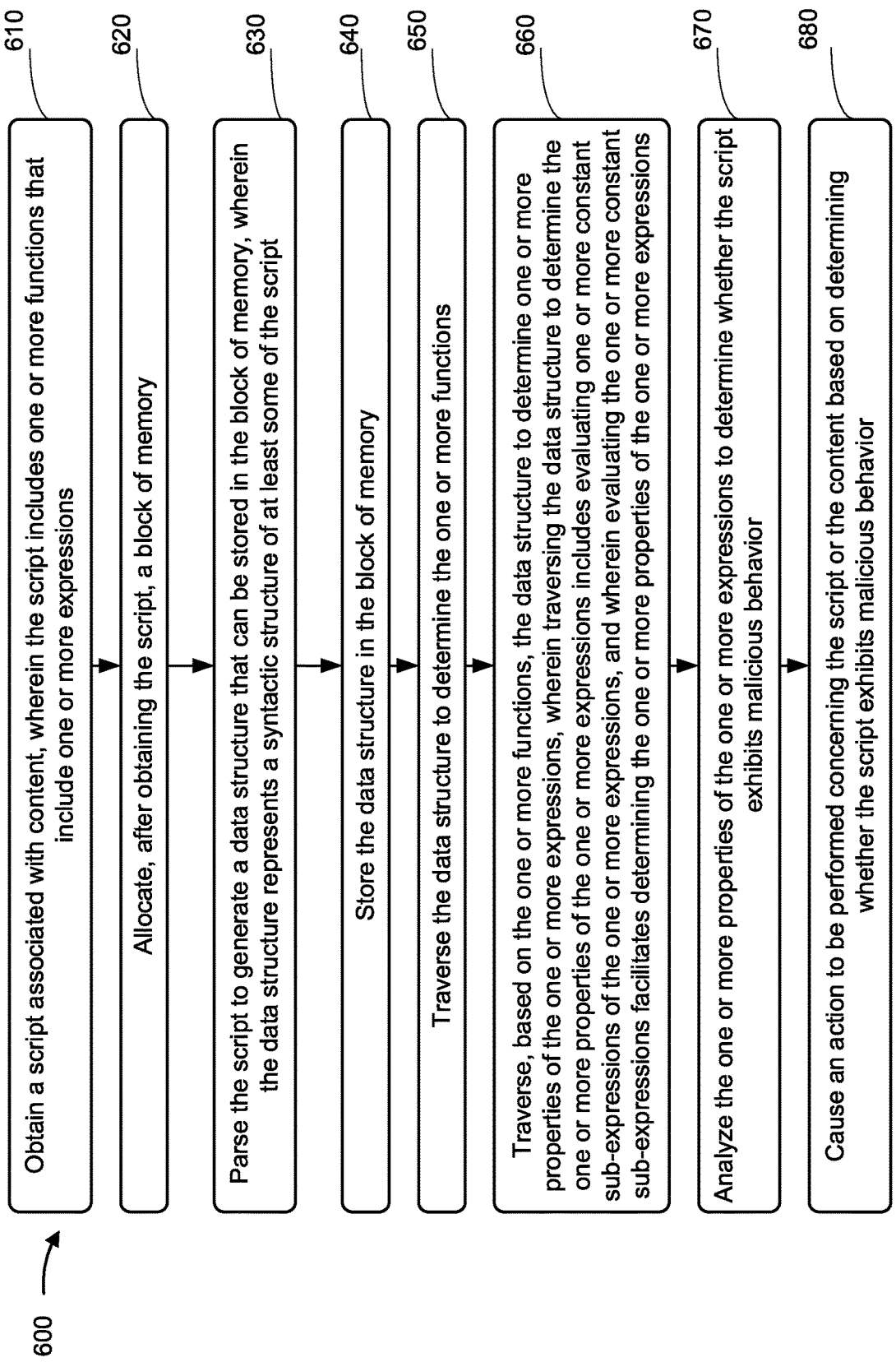

FIG. 6 is a flow chart of an example process 600 for behavioral detection of malicious scripts. In some implementations, one or more process blocks of FIG. 6 may be performed by a script analysis platform (e.g., script analysis platform 230). In some implementations, one or more process blocks of FIG. 6 may be performed by another device or a group of devices separate from or including the script analysis platform, such as a content collecting device (e.g., content collecting device 210), a computing resource (e.g., computing resources 234), a cloud computing environment (e.g., cloud computing environment 232), and/or the like.

As shown in FIG. 6, process 600 may include obtaining a script associated with content, wherein the script includes one or more functions that include one or more expressions (block 610). For example, the script analysis platform (e.g., using computing resource 234, processor 310, memory 315, storage component 320, input component 325, output component 330, communication interface 335, input component 355, switching component 360, output component 365, controller 370, and/or the like) may obtain a script associated with content, as described above. In some implementations, the script includes one or more functions that include one or more expressions.

As further shown in FIG. 6, process 600 may include allocating, after obtaining the script, a block of memory (block 620). For example, the script analysis platform (e.g., using computing resource 234, processor 310, memory 315, storage component 320, input component 325, output component 330, communication interface 335, input component 355, switching component 360, output component 365, controller 370, and/or the like) may allocate, after obtaining the script, a block of memory, as described above.

As further shown in FIG. 6, process 600 may include parsing the script to generate a data structure that can be stored in the block of memory, wherein the data structure represents a syntactic structure of at least some of the script (block 630). For example, the script analysis platform (e.g., using computing resource 234, processor 310, memory 315, storage component 320, input component 325, output component 330, communication interface 335, input component 355, switching component 360, output component 365, controller 370, and/or the like) may parse the script to generate a data structure that can be stored in the block of memory, as described above. In some aspects, the data structure represents a syntactic structure of at least some of the script.

As further shown in FIG. 6, process 600 may include storing the data structure in the block of memory (block 640). For example, the script analysis platform (e.g., using computing resource 234, processor 310, memory 315, storage component 320, input component 325, output component 330, communication interface 335, input component 355, switching component 360, output component 365, controller 370, and/or the like) may store the data structure in the block of memory, as described above.

As further shown in FIG. 6, process 600 may include traversing the data structure to determine the one or more functions (block 650). For example, the script analysis platform (e.g., using computing resource 234, processor 310, memory 315, storage component 320, input component 325, output component 330, communication interface 335, input component 355, switching component 360, output component 365, controller 370, and/or the like) may traverse the data structure to determine the one or more functions, as described above.

As further shown in FIG. 6, process 600 may include traversing, based on the one or more functions, the data structure to determine one or more properties of the one or more expressions, wherein traversing the data structure to determine the one or more properties of the one or more expressions includes evaluating one or more constant sub-expressions of the one or more expressions, and wherein evaluating the one or more constant sub-expressions facilitates determining the properties of the one or more expressions (block 660). For example, the script analysis platform (e.g., using computing resource 234, processor 310, memory 315, storage component 320, input component 325, output component 330, communication interface 335, input component 355, switching component 360, output component 365, controller 370, and/or the like) may traverse, based on the one or more functions, the data structure to determine one or more properties of the one or more expressions, as described above. In some implementations, traversing the data structure to determine the one or more properties of the one or more expressions includes evaluating one or more constant sub-expressions of the one or more expressions. In some implementations, evaluating the one or more constant sub-expressions facilitates determining the one or more properties of the one or more expressions.

As further shown in FIG. 6, process 600 may include analyzing the one or more properties of the one or more expressions to determine whether the script exhibits malicious behavior (block 670). For example, the script analysis platform (e.g., using computing resource 234, processor 310, memory 315, storage component 320, input component 325, output component 330, communication interface 335, input component 355, switching component 360, output component 365, controller 370, and/or the like) may analyze the one or more properties of the one or more expressions to determine whether the script exhibits malicious behavior, as described above.

As further shown in FIG. 6, process 600 may include causing an action to be performed concerning the script or the content based on determining whether the script exhibits malicious behavior (block 680). For example, the script analysis platform (e.g., using computing resource 234, processor 310, memory 315, storage component 320, input component 325, output component 330, communication interface 335, input component 355, switching component 360, output component 365, controller 370, and/or the like) may cause an action to be performed concerning the script or the content based on determining whether the script exhibits malicious behavior, as described above.

Process 600 may include additional implementations, such as any single implementation or any combination of implementations described below and/or in connection with one or more other processes described elsewhere herein.

In some implementations, when obtaining the script, the script analysis platform receives the script from a source device. In some implementations, the source device has removed the script from the content.

In some implementations, when causing the action to be performed concerning the script or the content, the script analysis platform causes, based on determining that the script does not exhibit malicious behavior, a source device to send the content and script to a different device.

In some implementations, the one or more properties of the one or more expressions are included in one or more symbol tables, and the script analysis platform, when analyzing the properties of the one or more expressions to determine whether the script exhibits malicious behavior, searches the one or more symbol tables for a property, of the one or more properties, that corresponds to an attribute of malicious behavior.

In some implementations, when analyzing the one or more properties of the one or more expressions to determine whether the script exhibits malicious behavior, the script analysis platform identifies a set of properties, of the one or more properties, and analyzes the set of properties to determine whether the set of properties exhibits malicious behavior. In some implementations, each property of the set of properties corresponds to one or more attributes of malicious behavior.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, "traffic" or "content" may include a set of packets. A "packet" may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    obtaining, by a device, a script associated with content,
        wherein the script includes one or more functions that include one or more expressions;
    parsing, by the device, the script to generate a data structure,
        wherein the data structure represents a syntactic structure of the script;
    traversing, by the device, the data structure to determine the one or more functions;
    traversing, by the device and based on the one or more functions, the data structure to determine properties of the one or more expressions,
        wherein a symbol table is maintained for an identifier associated with the one or more expressions, and
        wherein traversing the data structure based on the one or more functions includes evaluating one or more constant sub-expressions of the one or more expressions,
            wherein evaluating the one or more constant sub-expressions facilitates determining the properties of the one or more expressions, and
            wherein the one or more constant sub-expressions are evaluated by updating the symbol table to indicate a value of the identifier;
    analyzing, by the device, the properties of the one or more expressions to determine whether the script exhibits malicious behavior,
        wherein analyzing the properties of the one or more expressions comprises:
            parsing a description file that describes one or more attributes associated with malicious behavior,
                the description file to include whether an attribute that is ordinarily associated with malicious behavior is not associated with malicious behavior; and
    causing, by the device, an action to be performed concerning the script or the content based on determining whether the script exhibits malicious behavior.

2. The method of claim 1, wherein a constant sub-expression of the one or more constant sub-expressions includes at least one of:
    a constant number value;
    a constant string value;
    a combination of constant number values or constant string values; or
    a library function call associated with a computer language of the script that is called with at least one argument that is a constant number value, a constant string value, or a combination of constant number values or constant string values.

3. The method of claim 1, wherein the script is:
    a JavaScript script,
    a Visual Basic (VB) Script,
    a Visual Basic for Applications (VBA) script,
    a Jscript script, or
    a PowerShell script.

4. The method of claim 1, wherein causing the action to be performed concerning the script or the content comprises:
    causing, based on determining that the script exhibits malicious behavior, one or more of:
        the content or script to be deleted from a source device;
        the content or script to be quarantined at the source device to prohibit access to the content or script;
        a search to be performed, via a network, for other instances of the content or script on one or more other devices and for the other instances to be deleted;
        the one or more other devices to be analyzed for the malicious behavior; or
        a modification of network connectivity for the one or more other devices.

5. The method of claim 1, wherein traversing the data structure to determine the properties of the one or more expressions comprises:
    maintaining a call stack associated with the one or more expressions;
    maintaining the symbol table; and
    determining the properties of the one or more expressions based on information included in the symbol table.

6. The method of claim 5, wherein the symbol table includes information indicating at least one of:
    a scope of the identifier, or
    a reference to an assigned value of the identifier.

7. The method of claim 1, wherein malicious behavior includes at least one of the following attributes:
    accessing a global object using a complex array access;
    calling a function by calculating a complex expression;
    decoding a string value; or
    calling an evaluation or execution function by performing a complex string calculation.

8. A device, comprising:
one or more memories; and
one or more processors to:
obtain a script associated with content from a content collecting device,
wherein the script includes one or more functions that include one or more expressions;
parse the script to generate a data structure;
traverse the data structure to determine the one or more functions;
traverse, based on the one or more functions, the data structure to determine one or more properties of the one or more expressions,
wherein a symbol table is maintained for an identifier associated with the one or more expressions, and
wherein traversing the data structure based on the one or more functions includes evaluating one or more constant sub-expressions of the one or more expressions,
wherein evaluating the one or more constant sub-expressions facilitates determining the one or more properties of the one or more expressions, and
wherein the one or more constant sub-expressions are evaluated by updating the symbol table to indicate a value of the identifier instead of a reference to a value of the identifier;
obtain information that describes one or more attributes of malicious behavior;
analyze, based on the information, the one or more properties of the one or more expressions to determine whether the script exhibits malicious behavior; and
cause an action to be performed concerning the script or the content based on determining whether the script exhibits malicious behavior.

9. The device of claim 8, wherein the data structure is an abstract syntax tree (AST).

10. The device of claim 8, wherein the malicious behavior is a self-modifying code behavior.

11. The device of claim 8, wherein the one or more processors, when traversing the data structure to determine the one or more properties of the one or more expressions, are to:
determine one or more branches associated with the one or more expressions; and
traverse each branch of the one or more branches to determine the one or more properties of the one or more expressions.

12. The device of claim 8, wherein the one or more processors, when parsing the script to generate the data structure, are to:
allocate a block of memory to consecutively store two or more elements of the data structure,
wherein memory associated with the two or more elements of the data structure is to be deallocated by one deallocation call.

13. The device of claim 8, wherein the one or more processors, when analyzing the one or more properties of the one or more expressions to determine whether the script exhibits malicious behavior, are to:
determine, based on the information, that a property, of the one or more properties, corresponds to at least one attribute, of the one or more attributes, of malicious behavior; and
determine, based on the property corresponding to the at least one attribute of malicious behavior, that the script exhibits malicious behavior.

14. The device of claim 8, wherein the one or more processors, when analyzing the one or more properties of the one or more expressions to determine whether the script exhibits malicious behavior, are to:
determine, based on the information, that the one or more properties do not correspond to any of the one or more attributes of malicious behavior; and
determine, based on the one or more properties not corresponding to any attribute of malicious behavior, that the script does not exhibit malicious behavior.

15. The device of claim 8, wherein the one or more processors, when causing the action to be performed concerning the script or the content, are to:
cause, based on determining that the script exhibits malicious behavior, the content or script to be deleted from the content collecting device; or
cause, based on determining that the script does not exhibit malicious behavior, the content collecting device to send the content or script to a different device.

16. A non-transitory computer-readable medium storing instructions, the instructions comprising:
one or more instructions that, when executed by one or more processors, cause the one or more processors to:
obtain a script associated with content,
wherein the script includes one or more functions that include one or more expressions;
allocate, after obtaining the script, a block of memory;
parse the script to generate a data structure that can be stored in the block of memory,
wherein the data structure represents a syntactic structure of at least some of the script;
store the data structure in the block of memory;
traverse the data structure to determine the one or more functions;
traverse, based on the one or more functions, the data structure to determine one or more properties of the one or more expressions,
wherein a symbol table is maintained for an identifier associated with the one or more expressions, and
wherein traversing the data structure based on the one or more functions includes evaluating one or more constant sub-expressions of the one or more expressions,
wherein evaluating the one or more constant sub-expressions facilitates determining the one or more properties of the one or more expressions;
analyze the one or more properties of the one or more expressions to determine whether the script exhibits malicious behavior,
wherein the one or more instructions, that cause the one or more processors to analyze the properties of the one or more expressions, cause the one or more processors to:
parse a description file that describes one or more attributes associated with malicious behavior, the description file to include whether an attribute that is ordinarily associated with malicious behavior is not associated with malicious behavior; and
cause an action to be performed concerning the script or the content based on determining whether the script exhibits malicious behavior.

17. The non-transitory computer-readable medium of claim 16, wherein the one or more instructions, that cause the one or more processors to obtain the script, cause the one or more processors to:
receive the script from a source device,
wherein the source device has removed the script from the content.

18. The non-transitory computer-readable medium of claim 16, wherein the one or more instructions, that cause the one or more processors to cause the action to be performed concerning the script or the content, cause the one or more processors to:
cause, based on determining that the script does not exhibit malicious behavior, a source device to send the content and script to a different device.

19. The non-transitory computer-readable medium of claim 16,
wherein the one or more instructions, that cause the one or more processors to analyze the properties of the one or more expressions to determine whether the script exhibits malicious behavior, cause the one or more processors to:
search the symbol table for a property, of the one or more properties, that corresponds to an attribute of malicious behavior.

20. The non-transitory computer-readable medium of claim 16, wherein the one or more instructions, that cause the one or more processors to analyze the properties of the one or more expressions to determine whether the script exhibits malicious behavior, cause the one or more processors to:
identify a set of properties, of the one or more properties,
wherein each property of the set of properties corresponds to one or more attributes of malicious behavior; and
analyze the set of properties to determine whether the set of properties exhibits malicious behavior.

* * * * *